US009459436B2

(12) United States Patent
Smith

(10) Patent No.: US 9,459,436 B2
(45) Date of Patent: Oct. 4, 2016

(54) LINEAR LED OPTICAL ASSEMBLY FOR EMITTING COLLIMATED LIGHT

(75) Inventor: Todd J. Smith, Deep River, CT (US)

(73) Assignee: Whelen Engineering Company, Inc., Chester, CT (US)

( * ) Notice: Subject to any disclaimer, the term of this patent is extended or adjusted under 35 U.S.C. 154(b) by 463 days.

(21) Appl. No.: 13/620,116

(22) Filed: Sep. 14, 2012

(65) Prior Publication Data

US 2014/0078732 A1 Mar. 20, 2014

(51) Int. Cl.
| | |
|---|---|
| *F21V 7/09* | (2006.01) |
| *F21V 5/04* | (2006.01) |
| *G02B 19/00* | (2006.01) |
| *F21V 7/06* | (2006.01) |
| *F21V 7/00* | (2006.01) |
| *F21V 7/04* | (2006.01) |
| *F21Y 101/02* | (2006.01) |
| *F21Y 103/00* | (2016.01) |
| *F21V 13/04* | (2006.01) |
| *F21W 111/00* | (2006.01) |

(52) U.S. Cl.
CPC .............. *G02B 19/0028* (2013.01); *F21V 5/04* (2013.01); *F21V 7/005* (2013.01); *F21V 7/0033* (2013.01); *F21V 7/06* (2013.01); *G02B 19/0066* (2013.01); *F21V 7/0091* (2013.01); *F21V 7/04* (2013.01); *F21V 13/04* (2013.01); *F21W 2111/00* (2013.01); *F21Y 2101/02* (2013.01); *F21Y 2103/003* (2013.01)

(58) Field of Classification Search
CPC ........ F21V 7/0033; F21V 7/005; F21V 7/06; F21V 7/0091; F21V 13/04; F21V 7/0025; F21V 7/0066; F21V 7/04; F21Y 2103/003; G02B 19/0019; G02B 19/0028; G02B 19/0066; G02B 19/0061

USPC ....... 362/240, 241, 243, 245, 247, 297–300, 362/341, 346
See application file for complete search history.

(56) References Cited

U.S. PATENT DOCUMENTS

| | | | |
|---|---|---|---|
| 6,641,284 B2 * | 11/2003 | Stopa et al. | ................... 362/240 |
| 7,712,931 B1 | 5/2010 | Smith | |
| 8,246,212 B2 | 8/2012 | Schaefer et al. | |
| 8,247,957 B2 | 8/2012 | Chen et al. | |
| 2010/0110677 A1 | 5/2010 | Stein | |
| 2012/0049748 A1 | 3/2012 | Stuesse et al. | |

OTHER PUBLICATIONS

"Standard Plastic Lenses for Semiconductors," Ledil Oy, Tehdaskatu 13, 24100 SALO, Finland, Examples of Products, 14 pages (Aug. 3, 2005).
"OEM Module Guide," Dialight Lumidrives Ltd., 7 pages (2006).
"L2Optics Flare Lens," L2Optics Ltd., sales brochure, 2 pages (2005).

* cited by examiner

*Primary Examiner* — Anh Mai
*Assistant Examiner* — Steven Horikoshi
(74) *Attorney, Agent, or Firm* — Alix, Yale & Ristas, LLP

(57) ABSTRACT

An LED optical assembly includes a linear array of LEDs, longitudinal reflecting surfaces along each side of the array and medial reflecting surfaces between the LEDs. The medial reflecting surfaces are configured to redirect light oriented along the linear array into directions that will contribute to a light emission pattern from a warning, signaling or illumination light employing the LED optical assembly. The medial reflecting surfaces cooperate with other reflectors and/or lenses to integrate the redirected light into an intended light emission pattern.

18 Claims, 16 Drawing Sheets

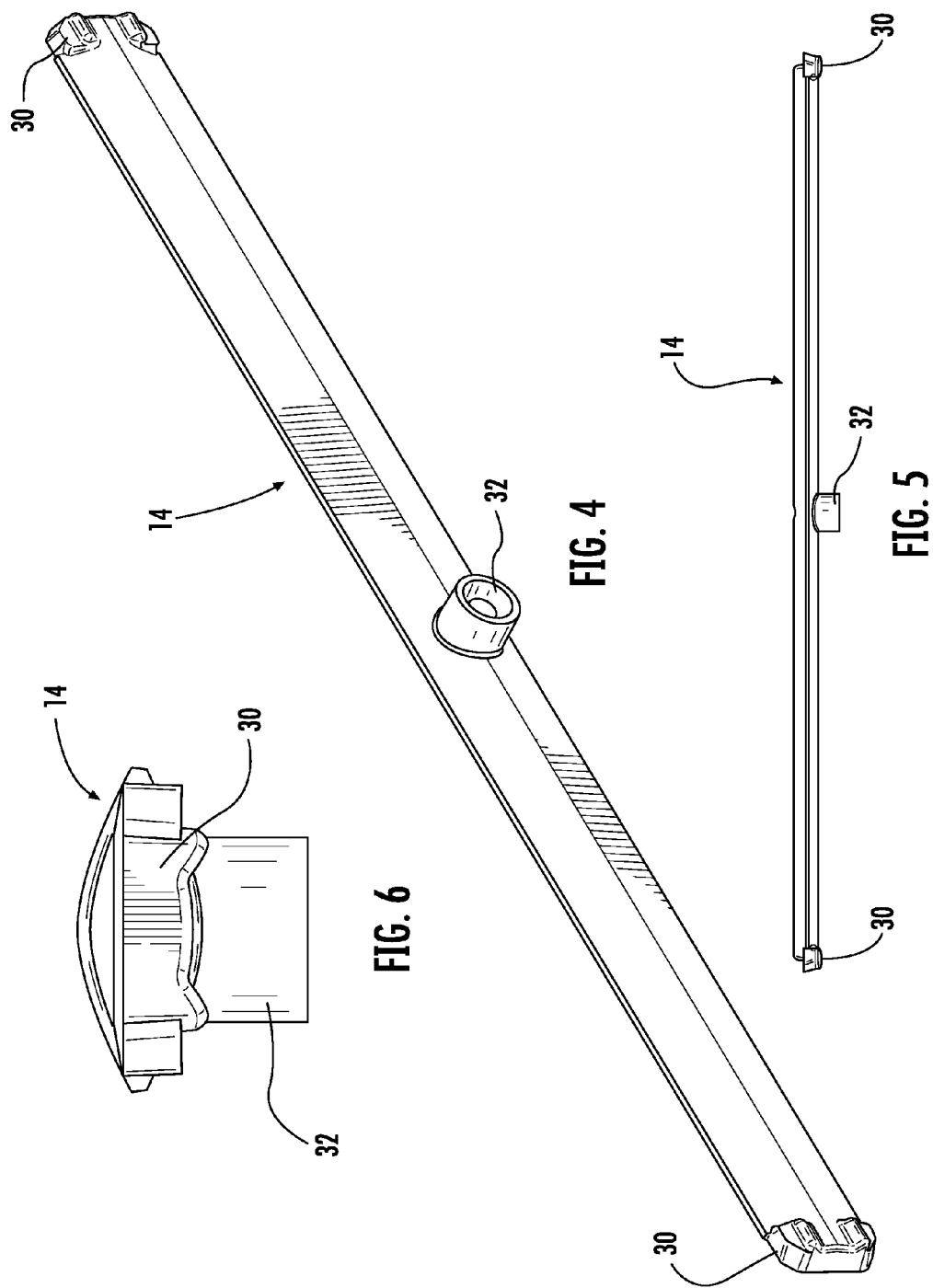

LINEAR LED OPTICAL ASSEMBLY FOR EMITTING COLLIMATED LIGHT

BACKGROUND

The present disclosure relates generally to warning light devices, and more particularly to optical configurations for producing integrated directional light from a LED light sources.

While not limited thereto in its utility, the novel technology to be described below is particularly well suited for use in combination with light emitting diodes (LED's) and, especially, for use in warning and signaling lights.

Commercially available LED's have characteristic spatial radiation patterns with respect to an optical axis which passes through the light emitting die. A common characteristic of LED radiation patterns is that light is emitted in a pattern surrounding the optical axis from one side of an imaginary plane containing the light emitting die, the optical axis being oriented perpendicular to this plane. Typically, the light generated by an LED is radiated within a hemisphere centered on the optical axis, with a majority of the light emitted at angles close to the optical axis of the LED. Although the quantity of light emitted typically declines as the angle relative to the optical axis of the LED increases, light emitted at angles greater than approximately 45° represents a significant portion of the overall light output of the LED. The distribution of light radiation within this hemisphere is determined by the shape and optical properties of the lens (if any) covering the light emitting die of the LED. Thus, LED's can be described as "directional" light sources, since all of the light they generate is emitted from one side of the device, with the other side dedicated to a support which provides electrical power to the LED and conducts heat away from the die.

When designing light sources for a particular purpose, it is important to maximize efficiency by ensuring that substantially all of the generated light is arranged in a pattern or field of illumination dictated by the end use of the device into which the light source is incorporated. The somewhat limited overall light output of individual LEDs frequently necessitates that several discrete devices be cooperatively employed to meet a particular photometric requirement. Use of arrays of LEDs and their directional emission pattern present peculiar challenges to the designer of warning and signaling lights. Employing LEDs in compact arrays additionally imposes cooling, i.e., "heat sinking", requirements which were not present in the case of prior art warning and signal light design.

SUMMARY

The present disclosure includes an optical assembly configured to produce an integrated light emission pattern relative to a first plane with limited spread in imaginary planes perpendicular to the first plane. For purposes of this application, light emitted from an LED can be described as "narrow angle" light emitted at an angle of less than about 45° from the optical axis and "wide angle" light emitted at an angle of more than about 45° from the optical axis as shown in FIG. 11. The initial trajectory of wide angle and narrow angle light may necessitate manipulation by different portions of a reflector and/or optical element to provide the desired illumination pattern.

In one disclosed embodiment, a plurality of LEDs are arranged on a support in a linear array, with the optical axes of the LEDs included in a first imaginary plane perpendicular to the support. An imaginary linear focal axis extends through the dies of the plurality of LEDs. Reflecting surfaces extend along either side of the array, forming a concave reflective trough. The reflective trough may be defined by a parabolic curve having a focus coincident with the linear focal axis and projected along said axis to form a linear parabolic surface. An elongated lens is positioned above the LEDs and longitudinally bisected by the first imaginary plane. The elongated lens and trough are configured so that light may not be emitted from the optical assembly without passing through the elongated lens or being redirected by the trough reflector. The elongated lens is configured to redirect light emitted from the array of LEDs (and not incident upon the reflecting trough) from its emitted trajectory into imaginary planes parallel with the first plane. The reflective trough redirects wide angle light (light not passing through the elongated lens) from its emitted trajectory into imaginary planes parallel with the first plane. The redirection performed by the trough reflector and elongated lens may be described as "partially collimated" or "collimated with respect to the first plane." Such partially collimated light retains the component of its emitted trajectory within the imaginary planes into which it is redirected, whereas fully collimated light is parallel with a line such as the optical axis of an LED.

In the disclosed embodiments, medial reflecting surfaces are also positioned between adjacent pairs of LEDs, to redirect a portion of the wide angle light from each LED into imaginary planes perpendicular to the first imaginary plane containing the optical axes of the LEDs. This subset of wide angle light from each LED is partially collimated with respect to an imaginary plane perpendicular to the first plane and including the optical axis of the respective LED. Light reflected from the medial reflecting surfaces retains the component of its emitted trajectory within the imaginary planes into which it is redirected, however this light must be further redirected by the elongated lens or trough reflector before being emitted from the optical assembly, where it is redirected into planes parallel with the first plane. Thus, the subset of wide angle light incident upon the medial reflectors is fully collimated with respect to the respective optical LED optical axis before exiting the optical assembly.

The shape of the medial reflecting surfaces is dictated by their function, e.g., redirecting this subset of wide angle light into trajectories having a smaller angular component with respect to imaginary planes perpendicular to both the first plane (containing the optical axes of the LEDs) and a plane defined by the LED support. The medial reflecting surfaces may take many forms, but preferably comprise a convex surface when viewed from a direction toward the LED support. A preferred surface configuration for the medial reflecting surface partially collimates the subset of wide angle light incident upon the medial reflecting surfaces into imaginary planes substantially perpendicular to both the first plane containing the LED optical axes and a plane defined by the LED support. In the disclosed embodiments, the medial reflecting surfaces are defined by a parabola having a focus centered on the area of light emission of a respective LED. This parabolic curve is then rotated about the imaginary linear focal axis of the array to form a three dimensional surface. The medial reflecting surfaces on either side of a respective LED are mirror images of each other. Other surface configurations approximating the intended function of the disclosed medial reflecting surfaces will occur to those skilled in the art. A semi-conical surface is an example of such an alternative configuration.

In the absence of the medial reflecting surfaces, the subset of wide angle light redirected by the medial reflecting surfaces would continue on its emitted trajectory and be lost (absorbed or scattered) within the assembly or be partially collimated by the trough reflector and elongated lens (into imaginary planes parallel with the first plane containing the LED optical axes). In either case, the retained component of the emitted trajectory of this subset of wide angle light (within the imaginary planes) means it cannot contribute to a majority of desirable light emission patterns and is effectively wasted.

It is known in the field of optics that reflecting surfaces may be formed as an internal reflecting surface or as polished or metalized external surfaces. Both types of surfaces are disclosed herein and are intended to be encompassed in the appended claims.

BRIEF DESCRIPTION OF THE DRAWINGS

Referring to the drawings, wherein like numerals refer to like elements in the several Figures:

FIG. 4 is a rear perspective view of the longitudinal lens of the optical assembly of FIG. 1;

FIG. 5 is a side plan view of the longitudinal lens of FIG. 4;

FIG. 6 is an enlarged end view of the longitudinal lens of FIGS. 4 and 5;

DETAILED DESCRIPTION OF THE DISCLOSED EMBODIMENTS

Figure 1:
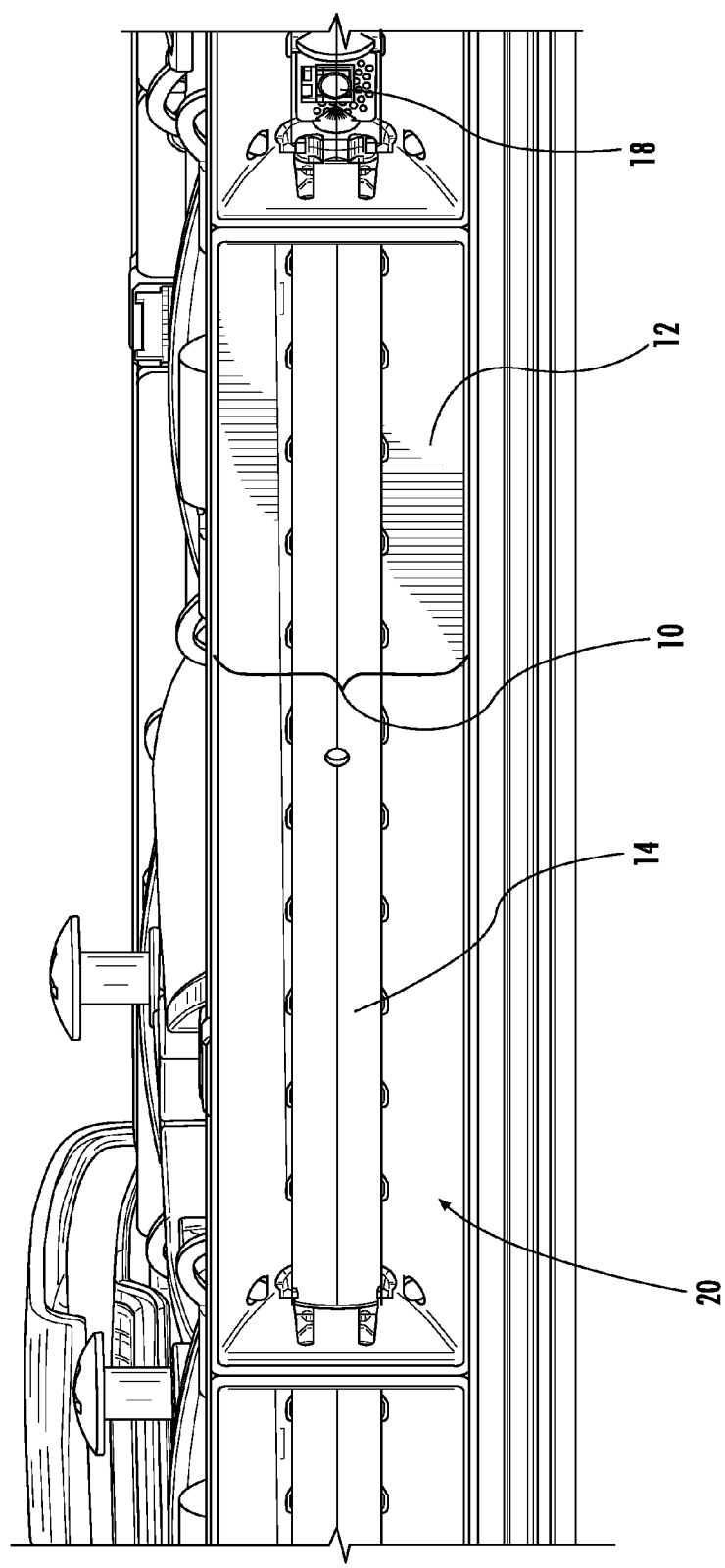
FIG. 1 is a front perspective view of a warning signal light including an LED optical assembly according to a first embodiment of the disclosure.

LED optical assemblies according to aspects of the present disclosure will now be described with reference to the figures, in which common reference numerals are used to designate similar components. FIGS. 1-11 illustrate a first LED optical assembly according to aspects of the disclosure. FIGS. 12-17 illustrate a second embodiment of an LED optical assembly according to aspects of the disclosure. The disclosed LED optical assemblies are suitable for use in emergency vehicle warning lights, but the disclosed optical assemblies may be appropriate for use in other warning and signaling apparatus as well as general illumination applications.

As shown in FIGS. 1-6, a warning light 20 incorporates an LED optical assembly 10 which includes a reflector 12, a longitudinal lens 14, medial reflecting surfaces 40 and LED light sources 18. The LED light sources 18 are arranged in a linear array on a planar support, such as a PC board 22. As shown in Figure ach LED 18 has an optical axis $O_A$ originating at the light emitting die of the LED 18 and projecting perpendicular to a plane P defined by the PC board 22 or other LED support. The LEDs 18 are arranged in a row with an imaginary linear focal axis $F_A$ extending through the light generating dies of the LEDs 18. The optical axes $O_A$ of the row of LEDs are contained in a common plane $P_1$ perpendicular to a plane P defined by the LED support (PC board 22). A longitudinal lens 14 is positioned above the row of LEDs 18 and extends the length of the reflector 12. In the disclosed embodiments, the lens 14 has a substantially constant sectional configuration and is designed to redirect light originating at the LEDs 18 and passing through the lens 14 into imaginary planes parallel with the plane $P_1$ containing the LED optical axes $O_A$. Light passing through the lens 14 will retain the component of its trajectory (if any) that is not parallel with plane $P_1$ and according to the terminology used in this application is "partially collimated" with respect to plane $P_1$. The sectional configuration of the disclosed longitudinal lens 14 is a conventional double convex configuration with modified longitudinal edges 15 to permit light to pass the lens 14. Other lens configurations will occur to those skilled in the art which will accomplish the function of partially collimating light from the LEDs and are compatible with the present disclosure.

The reflector 12 in the disclosed embodiments includes parallel, mirror image reflecting surfaces extending along each side of the array of LEDs 18. The function of the reflector is to redirect light originating from the LEDs 18 into planes parallel with plane $P_1$ which includes the optical axes $O_A$ of the LEDs 18. Light originating from the LEDs 18 and redirected by the reflector will retain the component of its trajectory (if any) that is not parallel with plane $P_1$ and thus may be described as partially collimated with respect to plane $P_1$. The disclosed configuration of the reflector 12 is a linear parabolic surface having a focus at the imaginary linear focal axis $F_A$ of the array of LEDs. Other surface configurations will occur to those skilled in the art that will approximate this functionality and are intended to fall within the scope of the disclosure.

Figure 2:
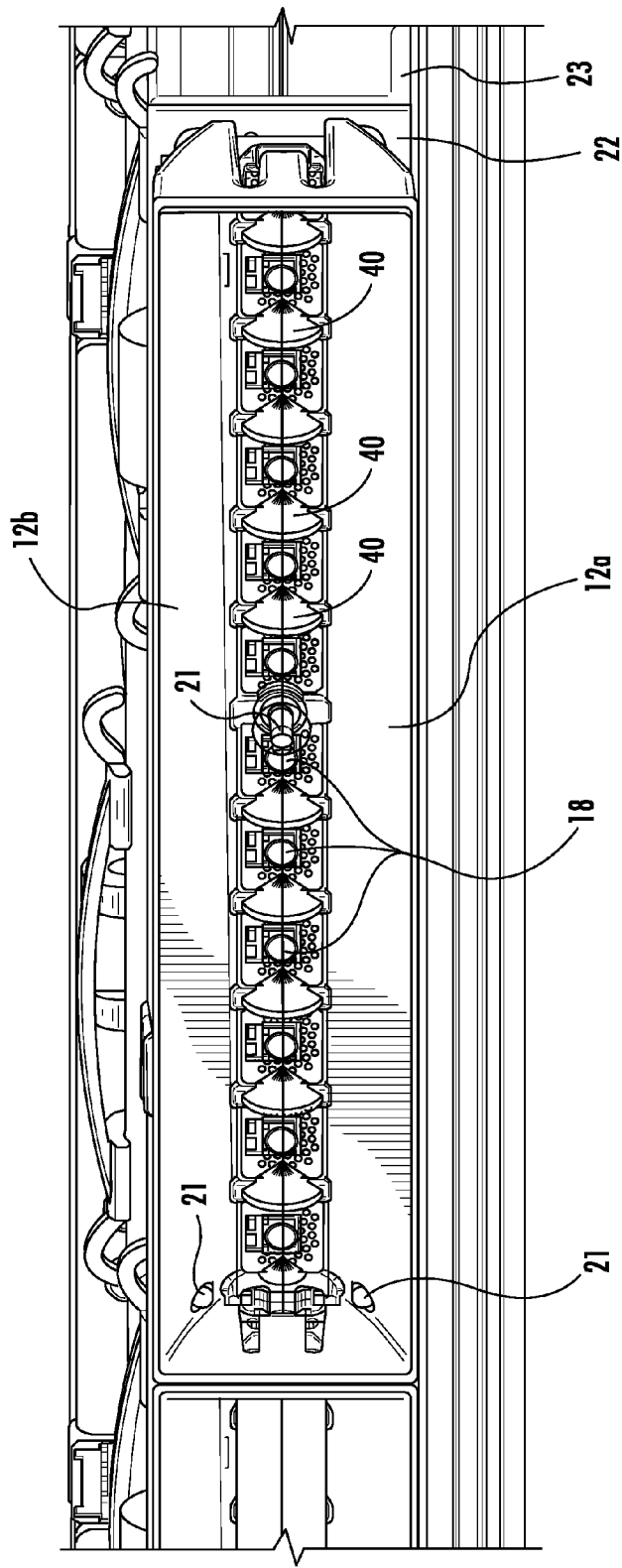
FIG. 2 shows the warning signal light and LED optical assembly of FIG. 1 with the longitudinal lens of the optical assembly removed for clarity.
Figure 3:
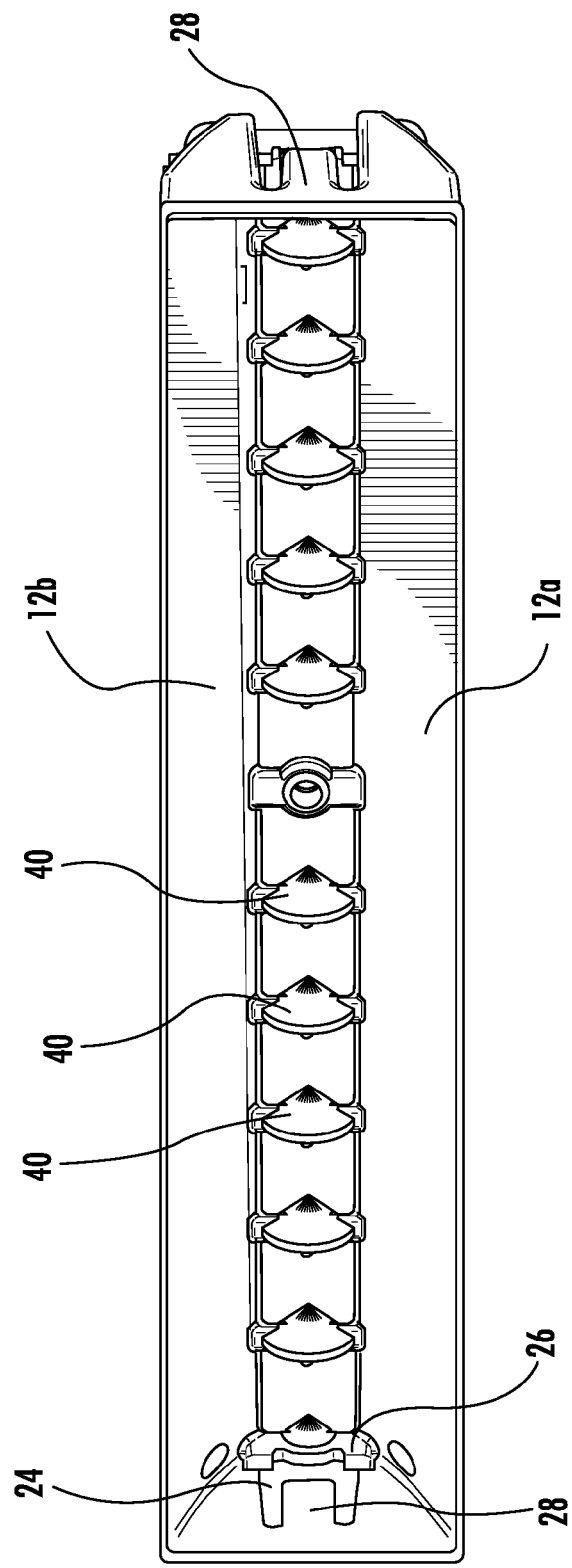
FIG. 3 is front perspective view of the reflector of the optical assembly of FIG. 1.
Figure 7:
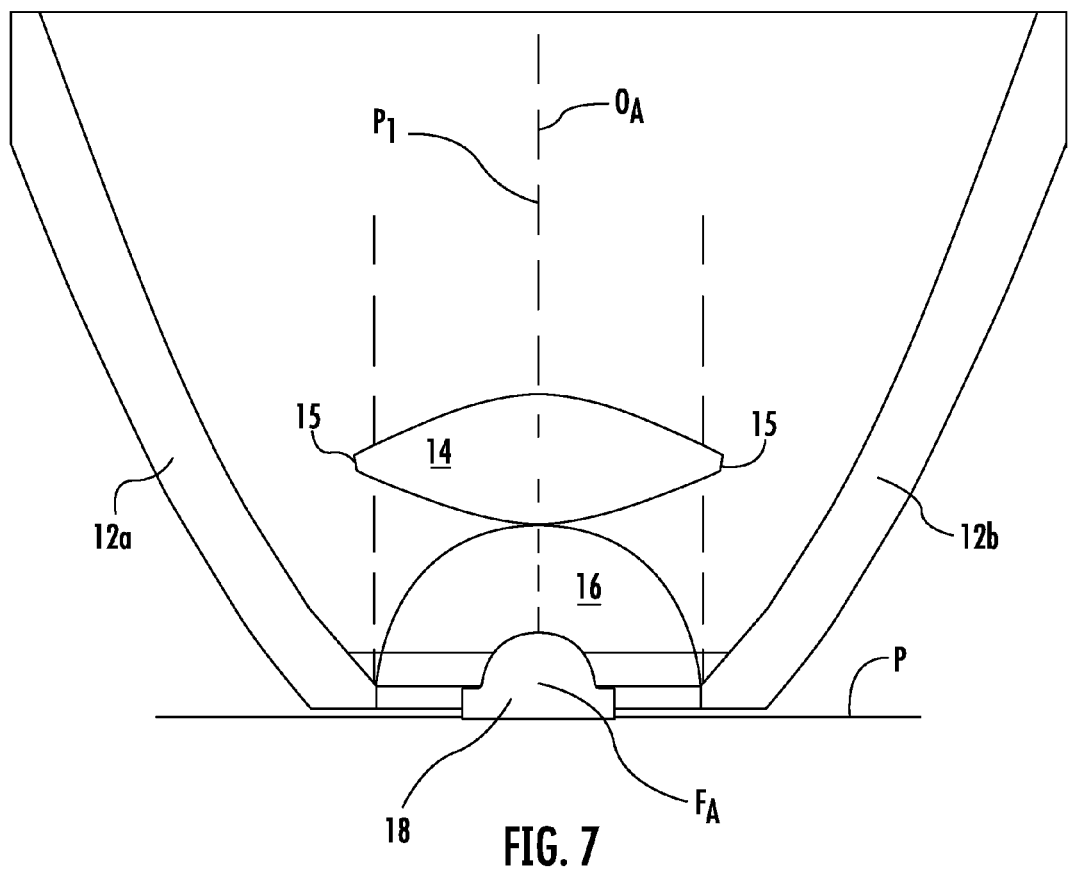
FIG. 7 is an enlarged sectional view through an LED optical assembly according to aspects of the disclosure.

As best seen in FIGS. 1-6, the reflector 12 and lens 14 are configured to snap together, with the ends of the reflector retaining the ends of the longitudinal lens 14. With reference to FIG. 3, the ends of the reflector include openings 24 between a cradle 26 and a retention tab 28. As shown in FIGS. 4-6, ends 30 of the longitudinal lens have a configuration complementary to the cradle 26 and tab 28. One end of the lens 14 is inserted into an opening 24 and advanced through the opening against the resilient movement of the tab 28. When one end 30 of the lens 14 has moved through the opening 24 sufficiently to permit the opposite end 30 to enter the reflector, the lens is pushed into the reflector until the end bears on the tab at the opposite end, which flexes to permit the lens ends 30 to be seated in their respective cradles 26 and held in place by the tabs. The disclosed lens 14 also includes a fastener receptacle, which also functions as a stand off to maintain the central portion of the length of the longitudinal lens 14 in position above the array of LEDs 18. Securing the lens 14 at both ends and in the middle helps prevent the lens from bowing away from the intended straight position under the influence of changing environmental conditions (temperature). In the disclosed warning lights 20, fasteners 21 extend through a heat sink 23 (see FIG. 2) and the PC board 22 to pull the reflector 12 and lens into an installed position and maintain an efficient thermal contact between the PC board 22 and the heat sink.

Figure 8:
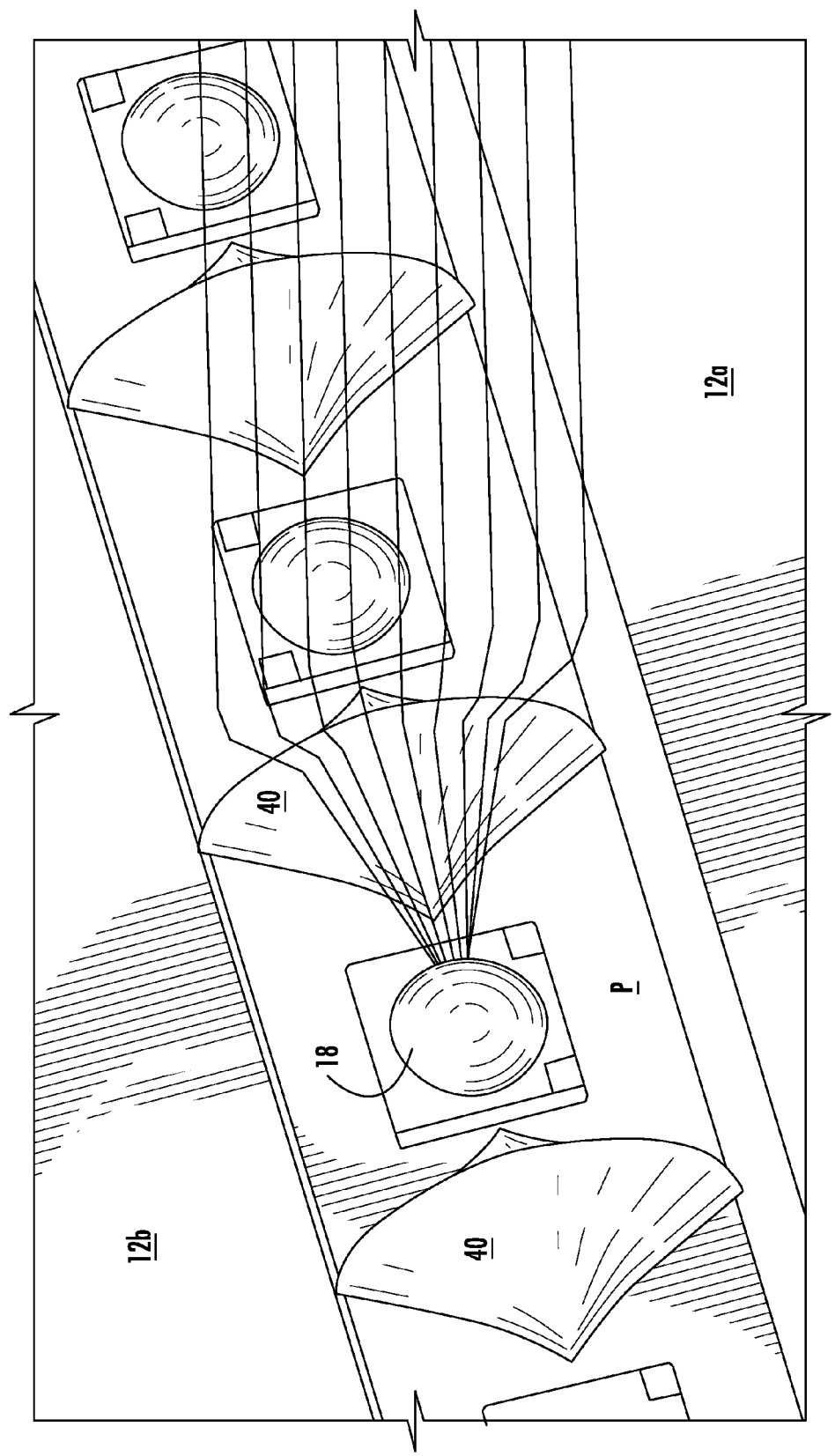
FIG. 8 is an enlarged partial front perspective view of an LED optical assembly according to aspects of the disclosure.
Figure 9:
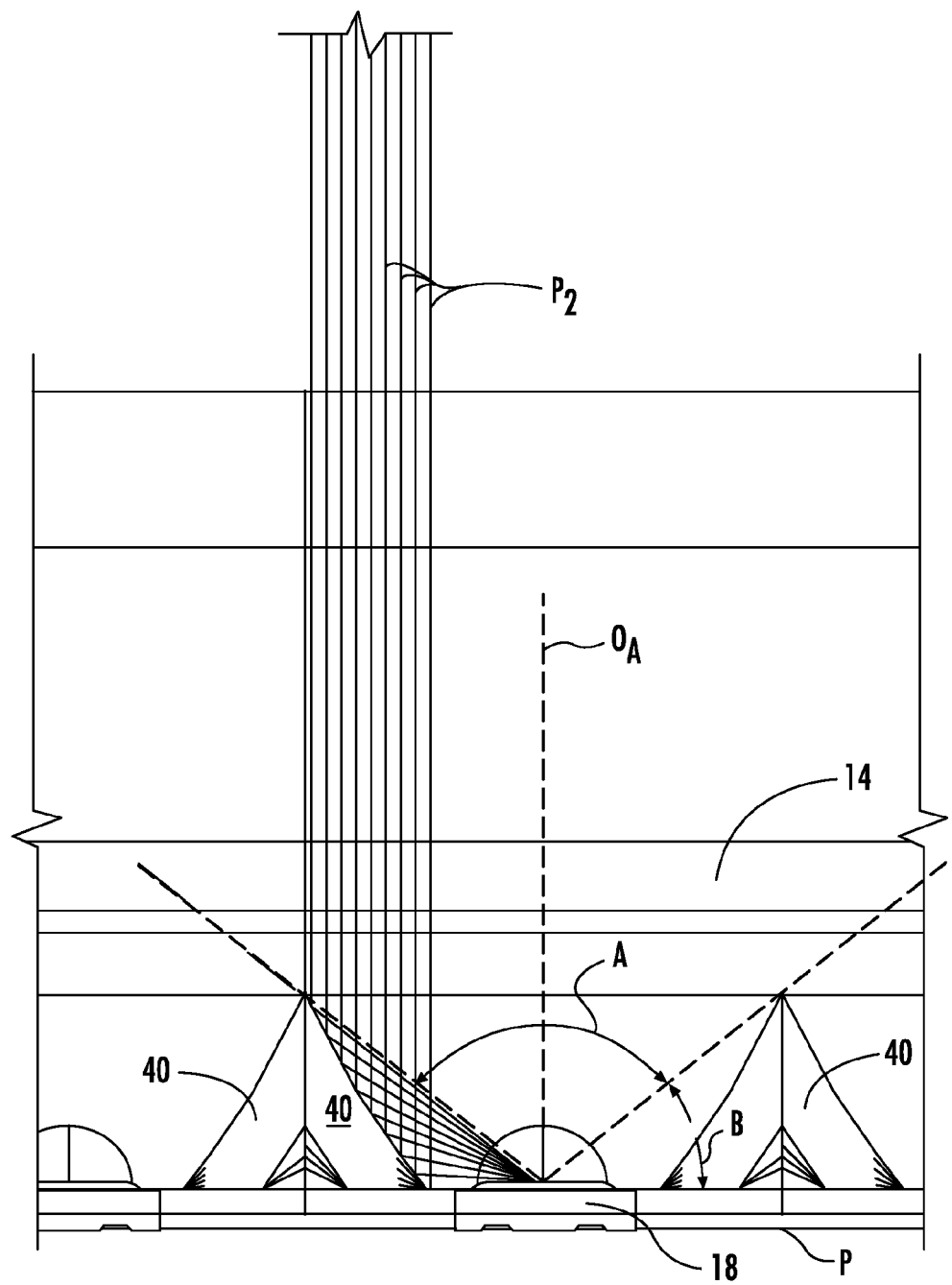
FIG. 9 is a partial longitudinal sectional view through the LED optical assembly of FIG. 8.
Figure 10:
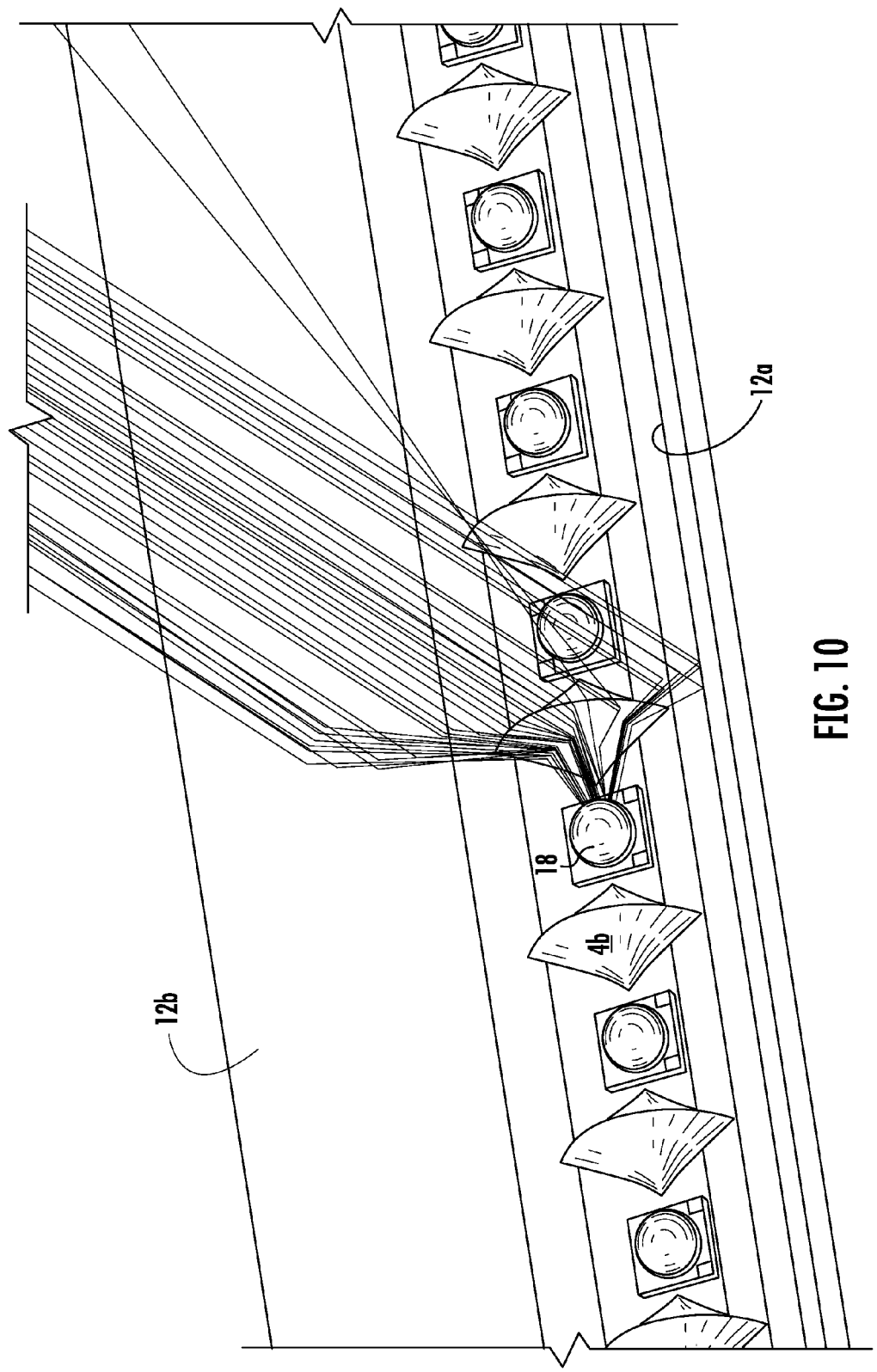
FIG. 10 is a partial perspective view from above of the LED optical assembly of FIG. 8.
Figure 11:
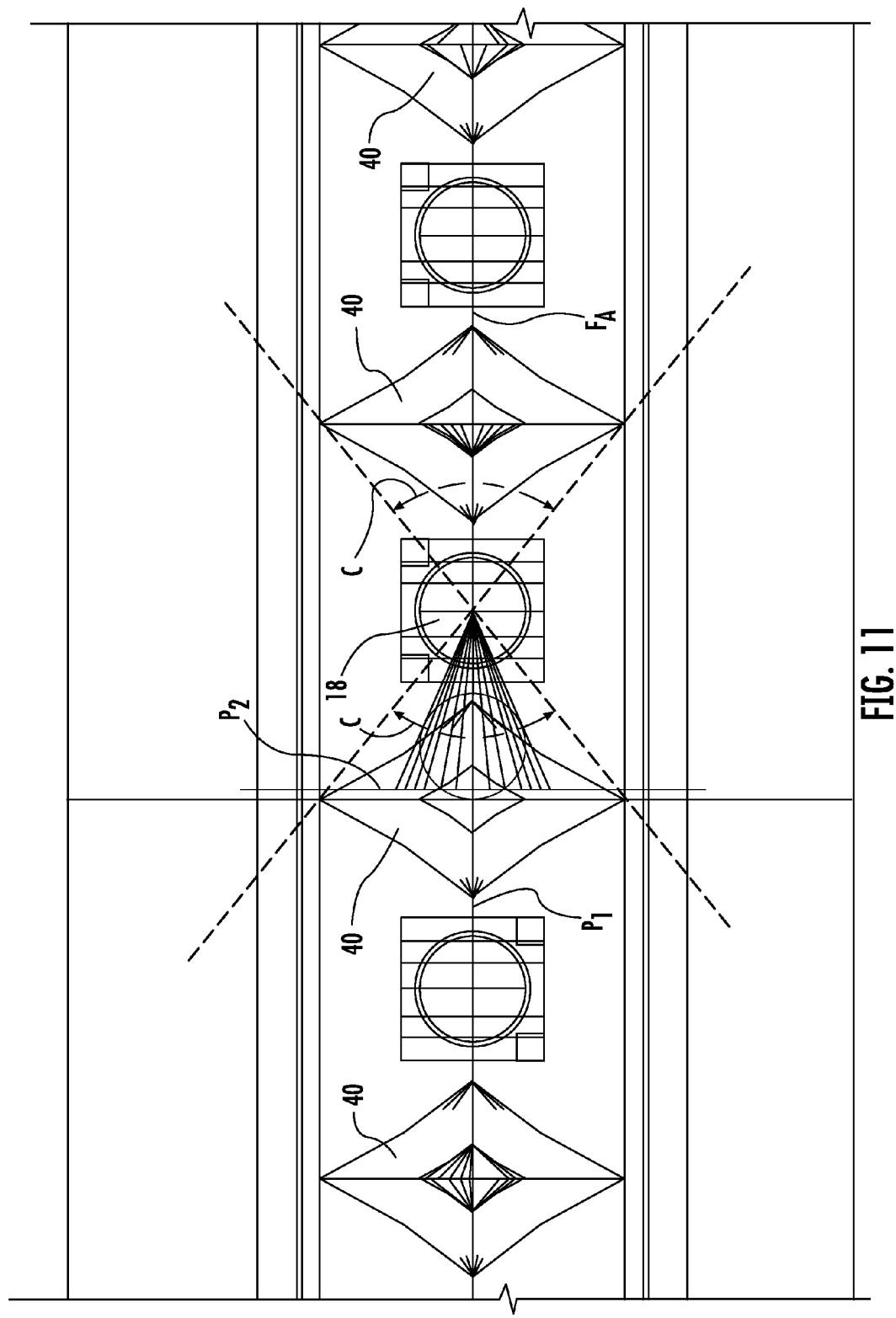
FIG. 11 is an enlarged top plan view of the LED optical assembly of FIG. 8.

FIGS. 2, 3, and 8-11 illustrate a disclosed configuration for medial reflecting surfaces 40 positioned between the reflecting surfaces 12a and 12b. As shown in FIG. 2, the linear array of LEDs extends between the reflecting surfaces 12a, 12b of the reflector 12. Each LED 18 emits light in a hemisphere surrounding its respective optical axis $O_A$. Those skilled in the art will recognize that the emitted trajectory of some of the light from LEDs in the array will not reinforce a desirable light emission pattern for the warning light 20 and is effectively wasted. In the disclosed warning light configuration, the light least likely to end up where it is useful is light emitted in a cone best understood with reference to FIGS. 9 and 11. The potentially wasted light is wide angle light emitted from each LED in a cone originating at the area of light emission (the LED die) and having a cone axis coincident with the linear focal axis $F_A$ of the LED array, so there are two such cones of light for each LED in the array. As best seen in FIG. 9, light incident upon the medial reflecting surfaces is emitted from the respective LED at an angle A of at least 45° relative to the optical axis $O_A$ of the LED. Angle B in FIG. 9 is the difference between angle A and 90°, and in the disclosed embodiments is approximately 40°. As best seen in FIG. 11, the medial reflecting surfaces extend between the linear reflecting surfaces 12a, 12b of the trough reflector to redirect light having an emitted trajectory of less than approximately 40° from the linear focal axis $F_A$ of the LED array and at an emitted trajectory of greater than approximately 45° relative to the optical axis $O_A$ of each respective LED 18. The result is redirection of a cone of light, where the cone has a radius equal to half the lateral distance between the linear reflecting surfaces 12a, 12b, an included angle C of approximately 80° and a height (measured along the linear focal axis $F_A$) of half the distance between LEDs in the array. It will be apparent that the cone of light is half a cone above the plane P defined by the LED support.

The medial reflectors are configured to redirect this light into trajectories that will contribute to the overall light emission pattern of the warning light 20. Generally speaking, such redirected trajectories are those closer to the optical axis $O_A$ of the respective LED 18 and/or further from the linear focal axis $F_A$ of the linear array. One disclosed configuration for the medial reflecting surface is defined by a parabolic curve having a focus at the area of LED light emission and rotated about the linear focal axis $F_A$. This surface shape is best observed in the three dimensional renderings of FIGS. 8 and 10. As shown in FIGS. 9 and 11, light incident upon the medial reflecting surfaces 40 is redirected into planes $P_2$ perpendicular to both the support plane P and the plane $P_1$ containing the optical axes $O_A$ of the LEDs 18. As shown in FIGS. 8 and 10, light incident upon the medial reflecting surfaces 40 retains the component of its emitted trajectory within the planes $P_2$ until passing through the longitudinal lens 14 or being reflected by the trough reflecting surfaces 12a, 12b. Light that is first redirected by the medial reflecting surfaces and then by the longitudinal lens 14 or trough reflecting surfaces is fully collimated (parallel) with respect to the optical axis of the respective LED 18, as shown in FIGS. 8 and 10. Thus light incident upon the medial reflecting surfaces 40 is incorporated into a desirable light emission pattern for the warning light 20.

It will be observed that in the warning light embodiment of FIGS. 1-11, LED light that is not incident upon the medial reflecting surfaces 40 is not fully collimated with respect to the optical axis $O_A$ of the respective LEDs and retains the component of its emitted trajectory (if any) within planes parallel with plane $P_1$ containing the optical axes $O_A$ of the LED array. The retained component of the emitted trajectory gives the warning light depicted in FIGS. 1-11 a wide angle light emission pattern which is ideal for many warning and signaling applications. The light emission pattern may be altered by employing the trough reflector 12 in combination with the medial reflecting surfaces, but omitting the longitudinal lens 14. Such an optical assembly would produce a light emission pattern having enhanced vertical spread, since the collimating action of the longitudinal lens 14 would be eliminated and light not incident upon either the trough reflecting surfaces 12a, 12b or the medial reflecting surfaces 40 would retain both components of its emitted trajectory. Such an optical configuration would partially collimate wide angle light incident upon the trough 12 and medial reflecting surfaces 40, but would permit narrow angle light to exit the assembly without redirection.

FIGS. 12-17 illustrate an alternative LED optical assembly according to aspects of the disclosure. The trough reflector 12 and longitudinal lens 14 are configured and operate in the same manner as that described with respect to the embodiment of the LED optical assembly illustrated in FIGS. 1-11. The LEDs 18 employed in both embodiments have the same operational characteristics.

Figure 12:
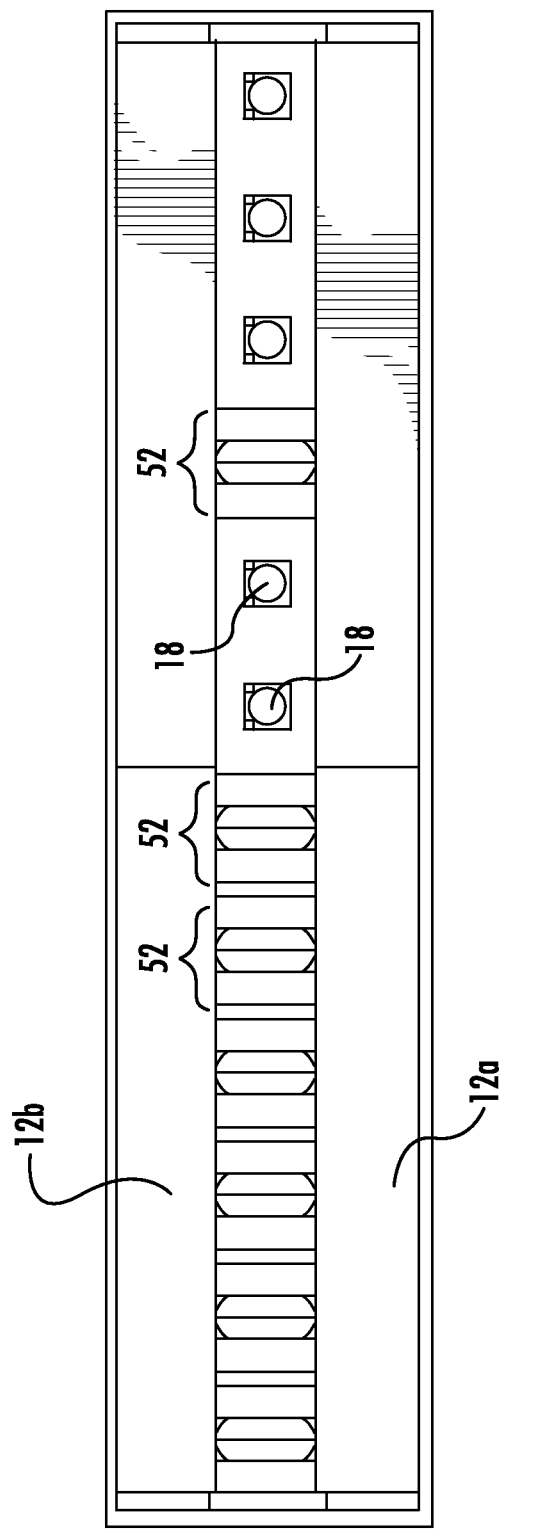
FIG. 12 is a front elevation view of a second embodiment of an LED optical assembly according to aspects of the disclosure.
Figure 13:
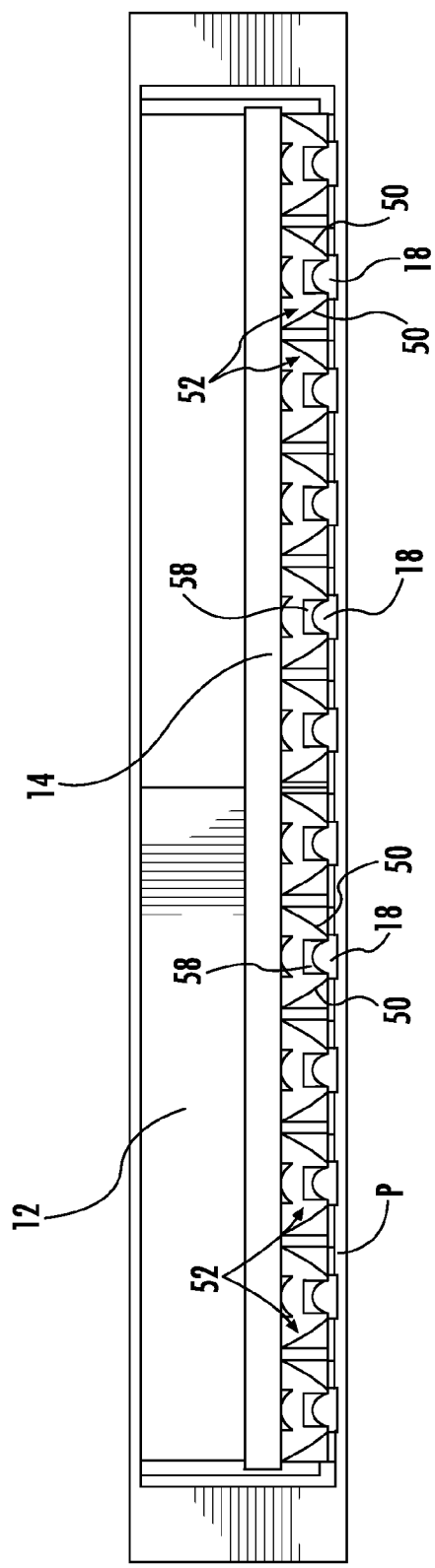
FIG. 13 is a longitudinal section view of the LED optical assembly of FIG. 12.
Figure 14:
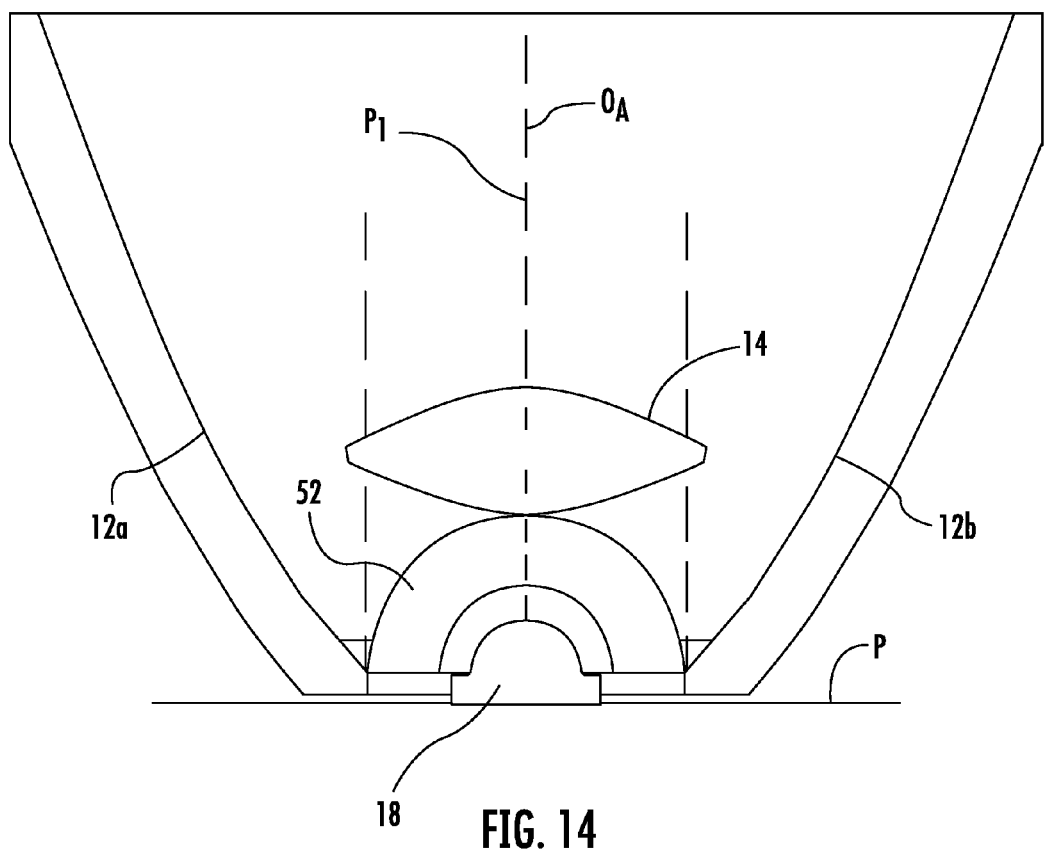
FIG. 14 is cross sectional view of an LED optical assembly consistent with the LED optical assemblies of FIGS. 12 and 13.
Figure 14A:
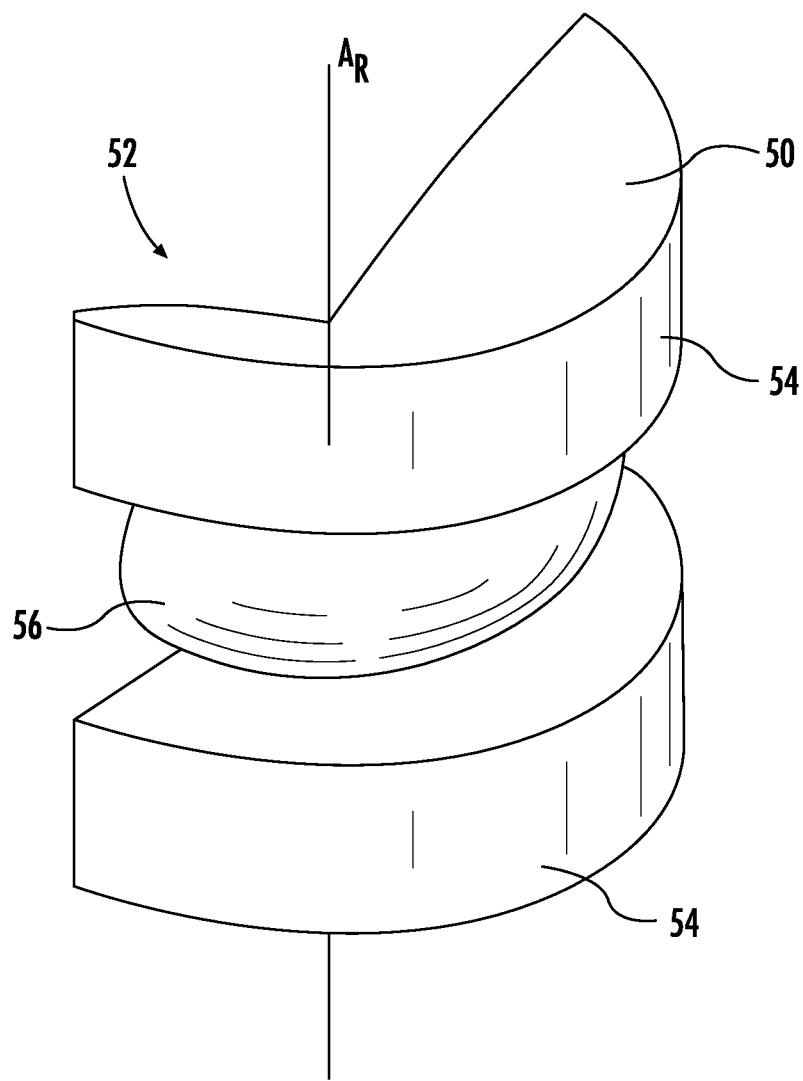
FIG. 14A is a three dimensional rendering of an optical element of the LED optical assembly of FIGS. 12-14.
Figure 15:
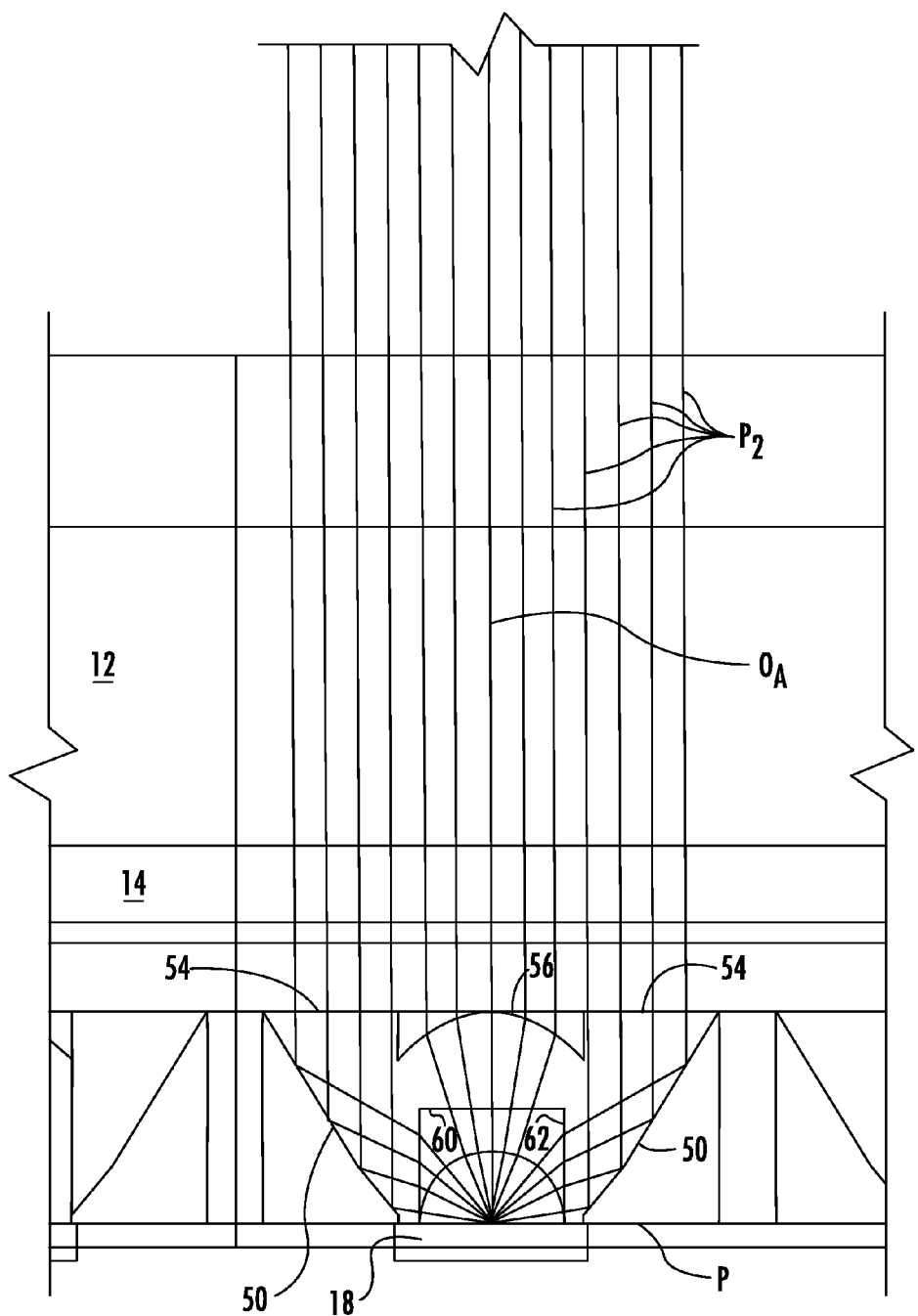
FIG. 15 is an enlarged, partial longitudinal sectional view of the LED optical assembly of FIGS. 12-14.

Those skilled in the art will recognize that a reflecting surface may be an external, polished or metalized surface or may be an internal surface of an optical solid, or so-called internal reflecting surface. In the embodiments shown in FIGS. 12-17, the medial reflecting surfaces are created as internal reflecting surfaces 50 of a three dimensional optical solid. As shown in FIGS. 12 and 13, each LED 18 is covered by a specifically configured optic that provides internal reflecting surfaces 50 arranged to redirect light in the same manner as the medial reflecting surfaces 40 described with respect to the LED optical assembly embodiment shown in FIGS. 1-11. As can be seen in FIG. 14, the basic structure of the LED optical assembly is the same as the previously described embodiment. An LED support defines a plane P and an LED optical axis $O_A$ projects from the LED area of light emission and perpendicular to the plane P. A solid optical segment 52 is constructed to partially collimate all the light from a respective LED with respect to planes $P_2$ that are perpendicular to both the support plane P and the plane $P_1$ containing the optical axes of the linear array of LEDs 18.

The optical segment is best described with reference to 13 and 14A. The optical segment 52 is defined by the sectional shape shown in FIG. 13 rotated approximately 180° about axis of revolution $A_R$. Thus, the illustrated surfaces 50, 54, and 56 become surfaces of revolution centered on the axis of revolution $A_R$. Each optical segment 52 includes a plurality of surfaces, with three groups of surfaces each performing a different optical function. Generally speaking, each optical segment 52 includes light entry surfaces 60, 62, light emission surfaces 54, 56 and an internal reflecting surface 50. More specifically, the light entry surface of each optical segment 52 includes a pair of light entry portions 60, 62 that together define a cavity 58. Light entry portions 60, 62 are arranged to intercept substantially all of the light rays comprising the light flux emitted by an associated LED 18. Finally, each optical element 52 has an internal reflecting surface 50. As may best be seen from FIGS. 13-17, internal reflecting surface is actually comprised of a pair of surfaces 50 which are mirror images and which are oppositely disposed with respect to an associated cavity 58. Similarly, the light entry surface 62 is actually defined by a pair of surfaces which are mirror images and which define two opposite sides of a cavity 58.

Figure 17:
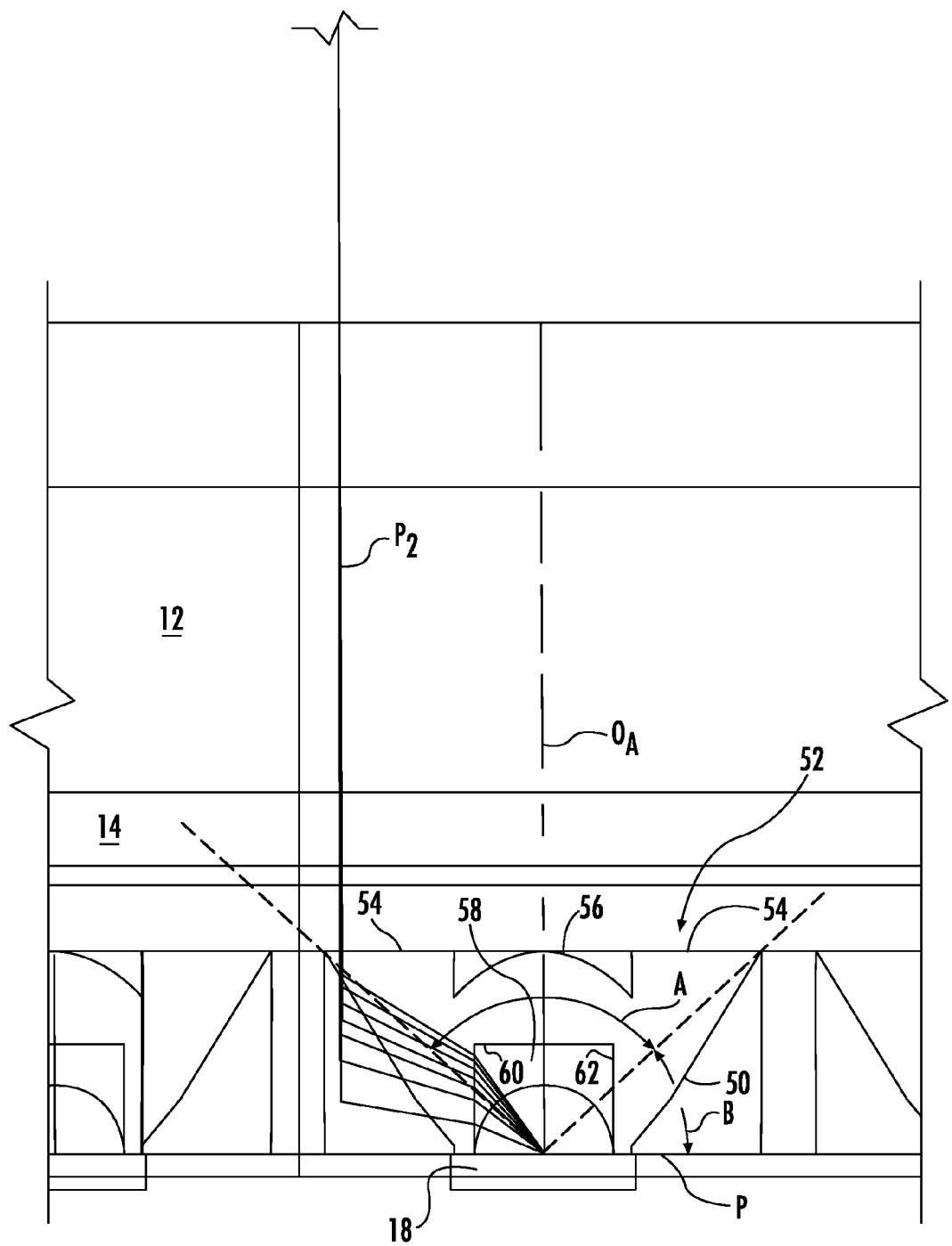
FIG. 17 is an enlarged partial longitudinal sectional view of the LED optical assembly of FIGS. 12-14.

As shown in FIG. 17, the light entry surfaces 60, 62 and the internal reflecting surfaces 50, through respective cooperative refraction and internal reflection, redirect the wide angle light from a respective LED 18 such that they are emitted from each optical element 52 as partially collimated light in planes $P_2$ perpendicular to both the support plane P and the plane $P_1$ containing the LED optical axes $O_A$. The shape of each of the internal reflecting surfaces 50 is configured for cooperation with a corresponding light entry surface 62. Light redirected by internal reflecting surfaces 50 is emitted from the optical segment 52 via respective emission surfaces 54 in planes $P_2$.

Figure 16:
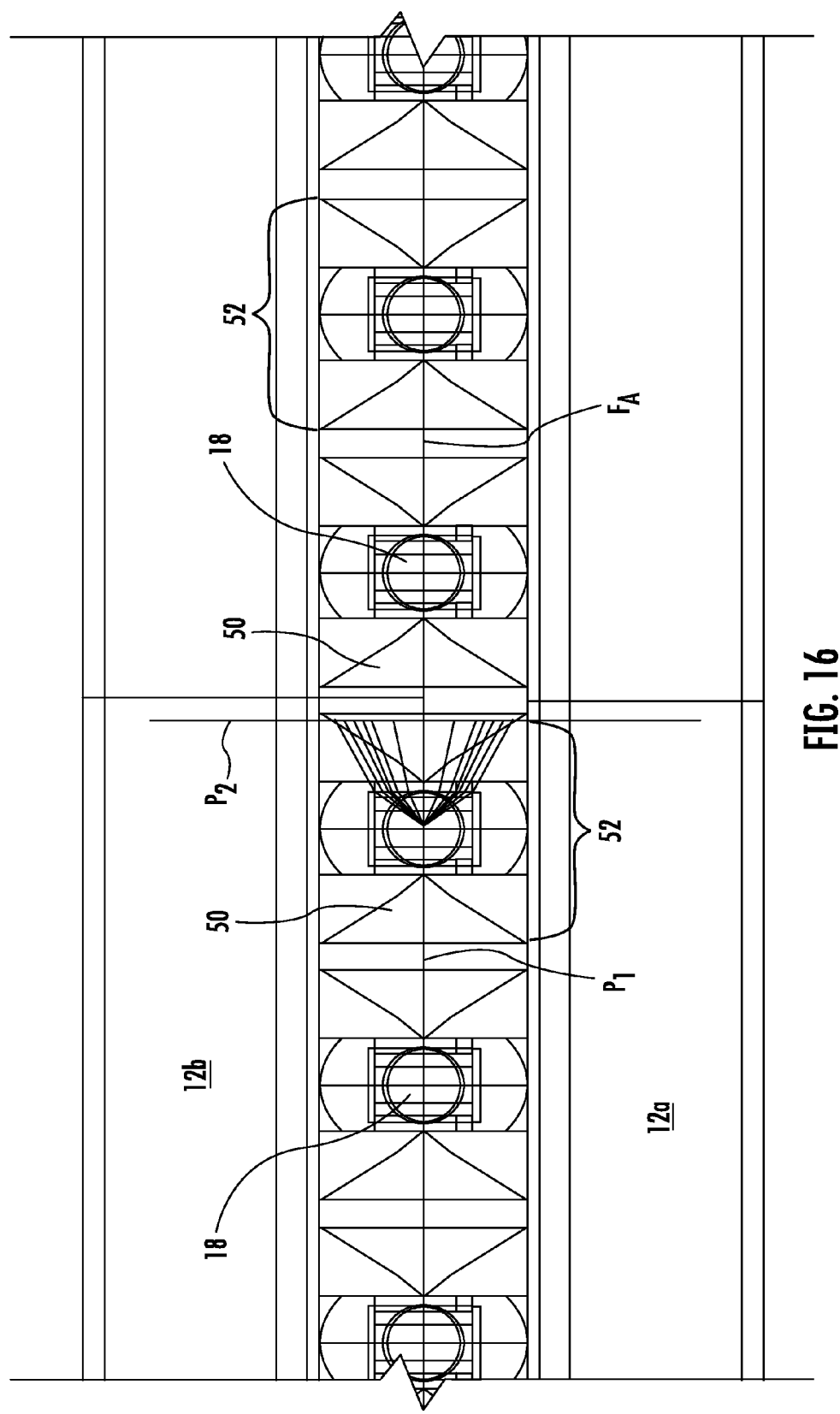
FIG. 16 is an enlarged, partial front view of the LED optical assembly of FIGS. 12-14.

Light entry surface 60 cooperates with light emission surface 56 to partially collimate light not redirected by surfaces 62 and 50. Thus, substantially all the light from LED 18 is partially collimated into planes $P_2$. As shown in FIG. 16, light emitted from optical segments 52 retains the component of its emitted trajectory within planes $P_2$ until it is redirected by the reflecting surfaces 12a, 12b or longitudinal lens 14. The resulting light emission from the LED optical assembly of FIGS. 12-17 is fully collimated. The LED optical assembly of FIGS. 12-17 may be more suitable for a directional light or application calling for a collimated light emission pattern. Omission of the longitudinal lens 14 from the LED optical assembly of FIGS. 12-17 results in a light emission pattern having enhanced spread or divergence with respect to plane $P_1$ containing the optical axes $O_A$ of the array of LEDs 18.

While exemplary embodiments have been set forth for purposes of illustration, the foregoing description is by way of illustration and not limitation. Accordingly, various modifications, adaptations and further alternatives may occur to one of skill in the art without the exercise of invention.

What is claimed is:

1. An LED optical assembly comprising:
a plurality of light emitting diodes (LEDs) arranged on a support, each LED having an optical axis and a light emission pattern surrounding said optical axis, said plurality of LEDs being arranged in a linear array with said optical axes arranged in a first plane, and said support being included in a second plane perpendicular to said first plane and provided with connections to electrical power, said light emission pattern including light divergent from said optical axis in the longitudinal direction and in a lateral direction perpendicular to said longitudinal direction and said first plane;
a pair of longitudinal reflecting surfaces separated by said first plane and extending along opposite sides of said linear array, said longitudinal reflecting surfaces defining a trough having a substantially constant sectional configuration;
a pair of medial reflecting surfaces extending between said longitudinal reflecting surfaces, said medial reflecting surfaces disposed on opposite longitudinal sides of at least one said LED and configured to redirect a portion of the light originating at said at least one said LED and incident upon said medial reflecting surfaces into planes perpendicular to both said first plane and said second plane, a portion of the light redirected by said medial reflecting surfaces being redirected by said longitudinal reflecting surfaces into planes parallel with said first plane,
wherein said medial reflecting surfaces are external reflecting surfaces,
whereby light emitted from said at least one LED and redirected by at least one medial reflecting surface and at least one longitudinal reflecting surface is collimated with respect to the optical axis of said at least one said LED, while light redirected by only said longitudinal reflecting surfaces is partially collimated with respect to said first plane and retains the divergence from the optical axis in the longitudinal direction.

2. The LED optical assembly of claim 1, wherein said longitudinal reflecting surfaces are mirror images of each other.

3. The LED optical assembly of claim 1, wherein said medial reflecting surfaces are mirror images of each other.

4. The LED optical assembly of claim 1, comprising a longitudinal lens extending the length of said linear array and configured to redirect light from said plurality of LEDs into planes parallel with said first plane.

5. The LED optical assembly of claim 4, wherein light redirected by at least one of said medial reflecting surfaces and said longitudinal lens is collimated with respect to the optical axis of said at least one said LED.

6. The LED optical assembly of claim 4, wherein said longitudinal reflecting surfaces are defined by a trough reflector having ends configured to receive and retain respective longitudinal ends of said longitudinal lens.

7. The LED optical assembly of claim 1, wherein said longitudinal reflecting surfaces and said medial reflecting surfaces are defined by parabolic curves having a focus at an area of light emission of said at least one said LED.

8. The LED optical assembly of claim 1, wherein said LED optical assembly is configured for use as a warning light for an emergency vehicle.

9. The LED optical assembly of claim 8, wherein said first plane is horizontal.

10. An LED optical assembly comprising:
a plurality of light emitting diodes (LEDs) arranged on a support, each LED having an optical axis and a light emission pattern surrounding said optical axis comprising narrow angle light having a range of emitted trajectories up to about 45° relative to said optical axis and wide angle light having a range of emitted trajectories at least about 45° relative to said optical axis, said plurality of LEDs being arranged in a linear array with said optical axes arranged in a first plane, and said support being included in a second plane perpendicular to said first plane and provided with connections to electrical power, said emitted trajectories including a first component divergent from said optical axis in a longitudinal direction and a second component divergent from said optical axis in a lateral direction perpendicular to said longitudinal direction;
a pair of longitudinal reflecting surfaces separated by said first plane and extending along opposite lateral sides of said linear array, said longitudinal reflecting surfaces defining a trough having a substantially constant sectional configuration and each configured to redirect wide angle light originating at said at least one said LED and incident upon said longitudinal reflecting surfaces into longitudinal reflected trajectories in planes parallel to said first plane, said longitudinal reflected trajectories retain said first component of said emitted trajectories divergent from said optical axis in the longitudinal direction;

a pair of medial reflecting surfaces extending between said longitudinal reflecting surfaces, said medial reflecting surfaces disposed on opposite longitudinal sides of at least one said LED and each configured to redirect wide angle light originating at said at least one said LED and incident upon said medial reflecting surface into medial reflected trajectories in planes perpendicular to both said first and second planes, said medial reflected trajectories retain said second component of said emitted trajectories divergent from said optical axis in the lateral direction;

wherein a portion of said wide angle light originating at said at least one LED passes said medial reflecting surface and said longitudinal reflecting surface redirects said portion of wide angle light into longitudinal reflected trajectories that retain said first component of said emitted trajectories divergent from said optical axis in the longitudinal direction.

11. The LED optical assembly of claim 10, wherein said longitudinal reflecting surfaces are mirror images of each other.

12. The LED optical assembly of claim 10, wherein said medial reflecting surfaces are mirror images of each other.

13. The LED optical assembly of claim 10, further comprising a longitudinal lens extending the length of said linear array configured to redirect a portion of the wide angle light reflected on said medial reflecting surfaces and the narrow angle light emitted from said plurality of LEDs and not incident upon said medial reflecting surfaces or said longitudinal reflecting surfaces into planes parallel with said first plane.

14. The LED optical assembly of claim 13, wherein light redirected by at least one of said medial reflecting surfaces and said longitudinal lens is collimated with respect to the optical axis of said at least one said LED.

15. The LED optical assembly of claim 13, wherein said longitudinal reflecting surfaces are defined by a trough reflector having ends configured to receive and retain respective longitudinal ends of said longitudinal lens.

16. The LED optical assembly of claim 10, wherein said longitudinal reflecting surfaces and said medial reflecting surfaces are defined by parabolic curves having a focus at an area of light emission of said at least one said LED.

17. The LED optical assembly of claim 10, wherein said LED optical assembly is configured for use as a warning light for an emergency vehicle.

18. The LED optical assembly of claim 17, wherein said first plane is horizontal.

* * * * *